Patented Mar. 24, 1953

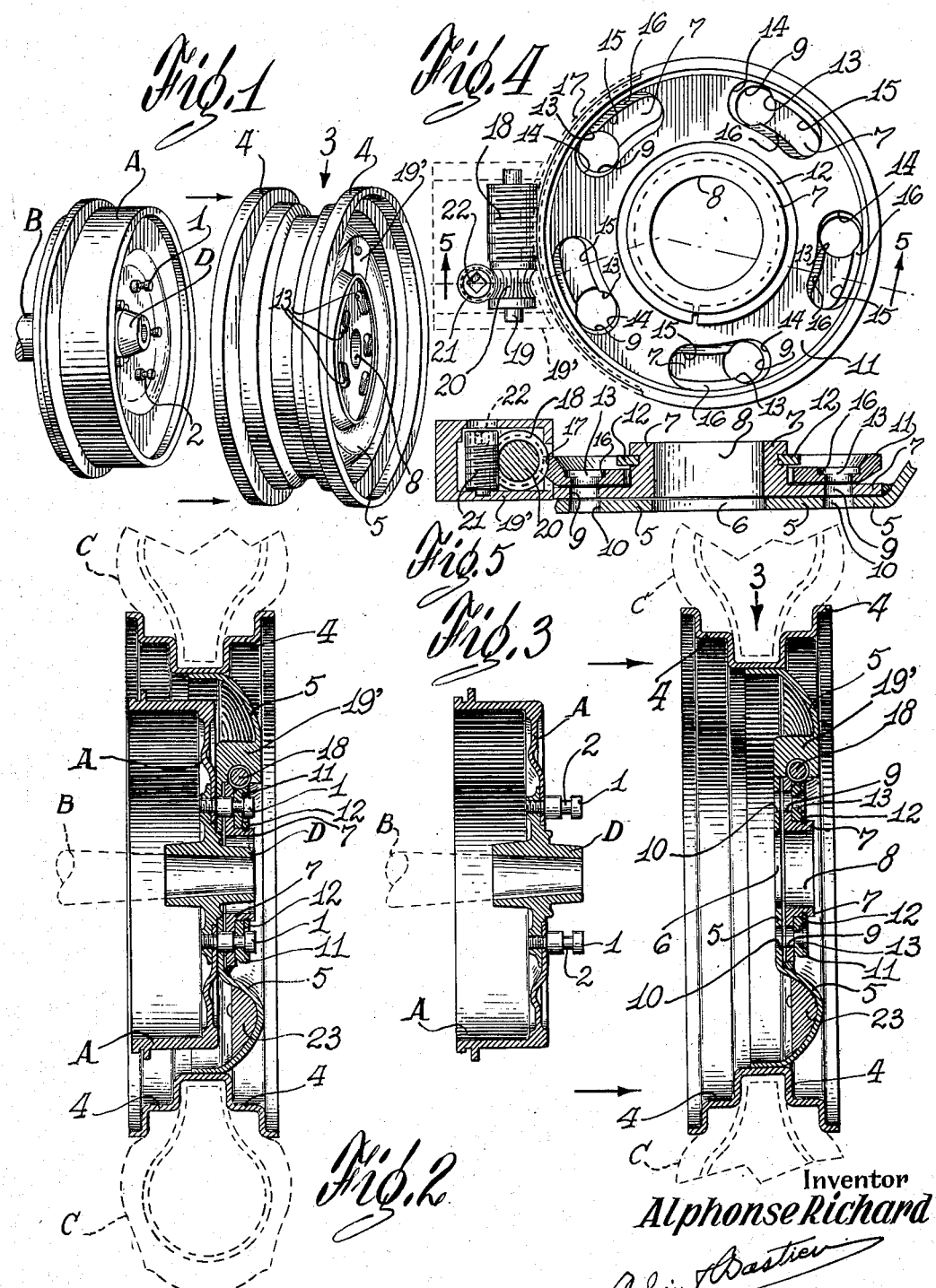

2,632,675

UNITED STATES PATENT OFFICE 2,632,675

WHEEL SECURING MEANS FOR VEHICLES

Alphonse Richard, St-Thecle, Quebec, Canada, assignor of thirty-five per cent to Richard J. Veillet and fifteen per cent to Robert Cloutier, both of St-Thecle, Quebec, Canada Application February 26, 1951, Serial No. 212,714

1 Claim. (Cl. 301—9)

The present invention relates to wheel securing means for vehicles and more particularly to securing means for the tire wheels of cars and trucks and like automotive vehicles.

The general object of the present invention is the provision of means for rapidly and easily securing and removing the wheels from the hubs of a vehicle.

Still another important object of the present invention is the provision of wheel securing means of the character described which will eliminate the plurality of bolting operations necessary in known wheel securing means.

Yet another important object of the present invention is the provision of wheel securing means of the character described which are very safe and efficient in use.

Yet another important object of the present invention is the provision of wheel securing means as mentioned here above which may be adapted as an attachment to standard vehicle wheels.

Yet another important object of the present invention is the provision of means of the character described which are simple and inexpensive to manufacture.

The foregoing and other important objects of the present invention will become more apparent during the following disclosure by referring to the drawings in which:

Fig. 1 is a perspective view of a vehicle hub and of the wheel according to the invention;

Fig. 2 is a cross-section of the wheel in assembled position over the hub;

Fig. 3 is a cross-section of the detached wheel and hub;

Fig. 4 is an elevation of the locking annular plate together with the actuating gear train; and Fig. 5 is a section along line 5—5 of Fig. 4.

Referring now more particularly to the drawings in which like reference characters indicate like elements throughout, the letter A denotes a standard conventional hub affixable to the axle B of a vehicle. The hub A instead of being provided with threaded bolts circumscribing the shaft B has mounted thereon a plurality of bolts 1, the head of which has an annular groove 2 for a purpose which will be described hereafter.

The wheel 3 according to the invention, has a rim 4 of conventional cross-section for receiving the tire C shown in dotted lines in Figs. 2 and 3.

To the rim 4 is secured a web 5 having the usual central aperture 6 adapted to receive the central projecting portion D of the hub A for centering of the wheel 3.

A ring 7 having an L shaped cross-section is secured to the outer face of the web 5 in such a manner that its central opening 8 registers with the opening 6 of said web and that the plurality of circumscribing holes 9 made therein register with the usual holes 10 of the web 5.

An annular plate 11 is applied to the outer surface of the ring 7 and may rotate relatively thereto. Said annular plate 11 is maintained in place on the sleeve portion of the ring 7 by means of a retaining or snap ring 12 engaging a suitable groove made in said sleeve portion in a manner similar to a piston ring.

The annular plate 11 is provided with a plurality of apertures 13, concentric with the axis of the wheel and formed by a circular portion 14 communicating with an elongated portion 15, the edges 16 of which form a rabbet as shown in Fig. 5 for receiving the head of the bolt 1. The annular plate 11 is also provided with a peripheral flange having a toothed sector 17 the outwardly projecting teeth of which mesh with an endless worm 18, the latter being mounted on a shaft 19 which is journaled in the box 19' integral with the web 5 of the wheel 3.

On one end of the shaft 19 is mounted a pinion 20 meshing with the second endless worm 21 extending at right angles thereto, and provided at one end with a square recess 22 for receiving a suitable manipulating tool.

Rotation of the worm 21 will rotate the worm 18 which will in turn rotate the annular plate 11 relatively to the wheel 3.

To lock the wheel in position on the hub A, the annular plate 11 is rotated so that the circular portion 14 of the apertures 13 registers with the openings 9 of the ring 7 and consequently with the openings 10 of the web 5. Then the wheel 3 is put in position over the hub A with the bolts 1 projecting through the above-mentioned openings, the grooves 2 thereof, opposite the annular plate 11. The latter is then rotated so that the restricted aperture portion 15 engages the grooves 2 of the bolt 1, the head of the latter resting on the rabbet of the edges 16 of said openings 13. Thus a single manipulation of a key or tool to rotate the worm 21 is necessary to secure the wheel 3 in position.

The web 5 of the wheel 3 is further provided with a counterweight 23 as shown in Fig. 3, diametrically opposed to the gear arrangement 17 to 22 in order to counter-balance the same.

It is seen that the ring 7, annular plate 11 and the gear arrangement 17 to 22 together with the box 19 and counter-weight 23 may be affixed to a standard wheel construction thereby providing an attachment which may be adapted to practically any standard type of tire wheels already in use.

It should also be noted that the worm gears used in the present invention effectively lock the annular plate against accidental rotation thereby providing very safe securing means for the vehicle wheel.

While a preferred embodiment according to the invention has been illustrated and described, it is understood that various modifications may be resorted to without departing from the spirit and scope of the appended claim.

I claim:

A wheel of the character described adapted to be removably secured to an axle driving hub, said hub provided with a plurality of outwardly projecting grooved bolts concentric with the axle, comprising a web provided with a plurality of holes to register with said bolts, a ring secured to said web, having a central sleeve portion to receive a central projecting portion of said hub and provided with a plurality of holes registering with the holes of said web, an annular plate slidably mounted on said ring and co-axial therewith, a snap ring inserted in a groove made in said central sleeve portion to retain said annular plate, said annular plate having slots disposed in an annular path concentric with said axle and registering with the holes of said ring and web, said slots having a restricted portion adapted to engage the groove of said bolts, a peripheral flange depending from said annular plate, outwardly projecting gear teeth provided at a portion of the periphery of said peripheral flange, an endless worm journaled in said web and meshing with said gear teeth, a pinion integral with said endless worm, a second endless worm extending at right angles to the axis of said first endless worm and meshing with said pinion, and a manipulating head projecting from said second endless worm to rotate said annular plate relatively to said ring and web.

ALPHONSE RICHARD.

REFERENCES CITED

The following references are of record in the file of this patent:

UNITED STATES PATENTS

| Number | Name | Date |
| --- | --- | --- |
| 2,031,114 | Lebel | Feb. 18, 1936 |
| 2,490,486 | Spurlock | Dec. 6, 1949 |
| 2,490,603 | Seserman | Dec. 6, 1949 |
| 2,568,370 | Scuderi | Sept. 18, 1951 |